Figure 1:
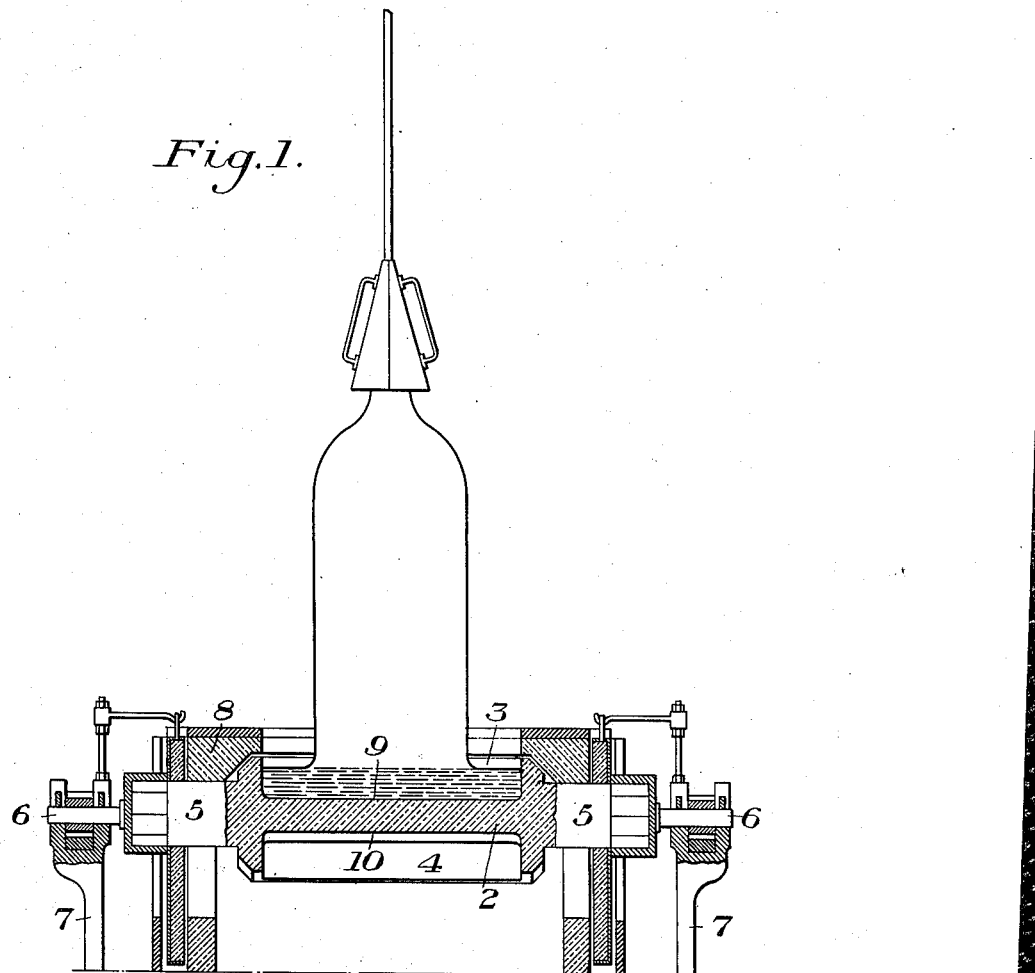

H. F. CLARK.
GLASS POT.
APPLICATION FILED AUG. 2, 1909.

963,276.

Patented July 5, 1910.
2 SHEETS—SHEET 1.

WITNESSES
R. A. Balderson
Walter Pamariss

INVENTOR
H. F. Clark,
by Bakewell, Byrnes Parmelee,
his Attys.

H. F. CLARK.
GLASS POT.
APPLICATION FILED AUG. 2, 1909.
963,276.
Patented July 5, 1910.
2 SHEETS—SHEET 2.
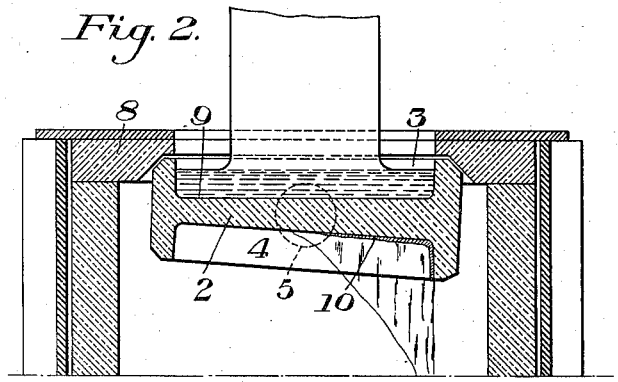
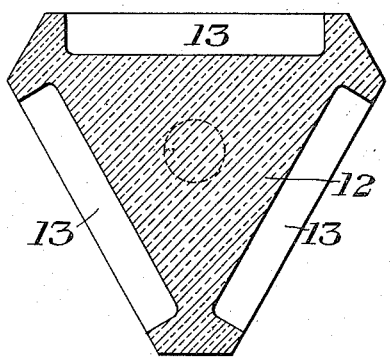
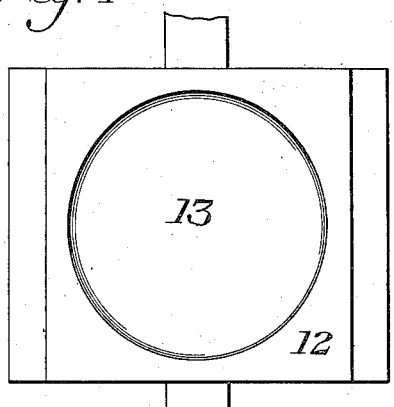

UNITED STATES PATENT OFFICE.

HENRY F. CLARK, OF JEANNETTE, PENNSYLVANIA, ASSIGNOR TO WINDOW GLASS MACHINE COMPANY, OF PITTSBURG, PENNSYLVANIA, A CORPORATION OF NEW JERSEY.

GLASS-POT.

963,276.

Specification of Letters Patent. Patented July 5, 1910.

Application filed August 2, 1909. Serial No. 510,694.

*To all whom it may concern:*

Be it known that I, HENRY F. CLARK, of Jeannette, Westmoreland county, Pennsylvania, have invented a new and useful Improvement in Glass-Pots, of which the following is a full, clear, and exact description, reference being had to the accompanying drawings, forming part of this specification, in which—

Figure 1 is a sectional elevation showing a glass pot embodying my invention; and Fig. 2 is a section taken in a plane at right angles to the plane of section of Fig. 1; Fig. 3 is a sectional view of a modified form of the pot; and Fig. 4 is a plan view of the pot shown in Fig. 3.

Heretofore, in drawing glass articles, much difficulty has been experienced by reason of the presence of bubbles in the glass from which the articles are being drawn, these bubbles causing defects in the drawn article. Many attempts have been made to discover the cause of this difficulty and to obviate it. I have discovered that the presence of these bubbles is due to the fact that the residue of glass left on the walls of the pot from a previous drawing operation has not been thoroughly removed; but that small buttons or globules of glass adhere to such walls. The effect of these adhering buttons or globules is, when a fresh batch of glass is placed in the pot, to produce these objectionable blisters.

My invention has particular relation to reversible or rotatable glass pots having a plurality of cavities. In the use of such pots, as heretofore, it has been customary during the drawing operation from one side of the pot, to apply heat to the opposite or lower cavity of the pot for the purpose of melting and draining out the residue of glass left from the previous operation, the two sides of the pot being used alternately in drawing. The pot cavities have been provided with parallel bottom walls, so that the lower cavity which is being drained of the glass residue is in substantially horizontal position during the draining operation. I have found that the glass cannot be thoroughly removed from the walls of the pot cavity in this position, but that the buttons or globules above referred to will remain in the pot. To overcome this difficulty, I have provided a reversible or rotatable pot having a plurality of pot cavities or receptacles therein, the bottom walls of which are at an angle to each other, and so arranged that when the bottom wall of one pot cavity or receptacle is in substantially horizontal position during the drawing operation, the bottom wall of the next pot cavity or receptacle to be used, and from which the residue of glass from the previous operation is being melted and drained out, is in an inclined position. By reason of this inclined position, I have discovered that a thorough draining of the pot cavity may be obtained and that the adhering of the globules or buttons of glass may be prevented.

Referring to the accompanying drawings, the numeral 2 in Figs. 1 and 2 designates a reversible pot having the pot cavities 3 and 4 at opposite sides thereof. This pot is mounted on the trunnion members 5 and 6 in suitable supports 7. In the drawing, I have shown the pot mounted in substantially the same manner as described and claimed in the patent to Lincoln Thornburg, No. 759,329, dated May 10, 1904, the pot being capable of being raised and lowered relatively to the top stone 8, so that it can be readily reversed to bring either pot cavity into use in drawing.

In accordance with my invention, the bottom walls 9 and 10 of the two pot cavities 3 and 4 are at an angle to each other, as most clearly shown in Fig. 2, so that when the bottom wall of the upper pot cavity from which the glass is drawn, is in a substantially horizontal position, the bottom wall of the lower pot cavity has a substantial inclination sufficient to give a thorough drainage toward one side, as indicated in Fig. 2. The pot is held in the proper leveled position for drawing by its engagement with the top stone or plate 8.

In Fig. 3 I have shown a modified form of the invention, wherein the pot body 12 is of triangular form in cross-section, with a pot cavity 13 in each of its three sides. It will be readily understood that when any one of the pot cavities is in horizontal position for drawing, the other two pot cavities will have their bottom walls at inclined position so as to be effectively drained in accordance with my invention.

It will be understood that heat is applied to the cavity or cavities of the pot which are being drained, in the usual manner during the draining operation.

It will be understood that my invention is susceptible of various other embodiments, since I believe myself to be broadly the first to provide a rotatable or reversible glass pot having a plurality of cavities or receptacles whose bottom walls are at an angle to each other, for the purpose stated.

I claim:—

1. A reversible or rotatable glass pot having a plurality of cavities or receptacles, the bottom walls of which are at an oblique angle to each other; substantially as described.

2. A reversible glass drawing pot having a plurality of cavities or receptacles whose bottom walls are at an angle to each other, and means for supporting the said pot in positions in which the bottom wall of one cavity will be horizontal and the bottom wall or walls of the other cavity or cavities will be inclined; substantially as described.

3. A reversible glass drawing pot having the bottom walls of its two cavities or receptacles at an oblique angle to each other; substantially as described.

In testimony whereof, I have hereunto set my hand.

HENRY F. CLARK.

Witnesses:
H. M. CORWIN,
GEO. H. PARMELEE.